Patented Dec. 27, 1949

2,492,848

UNITED STATES PATENT OFFICE 2,492,848

TEMPORARY PROTECTIVE COATING

Willie W. Crouch and Joseph A. Delap, Bartlesville, Okla., assignors to Phillips Petroleum Company, a corporation of Delaware No Drawing. Application September 30, 1946, Serial No. 700,350

5 Claims. (Cl. 117—6)

This invention relates to the prevention of rust, particularly to the provision of temporary coatings for the prevention of rusting of ferrous surfaces such as machinery and agricultural equipment.

It is often desirable to provide machinery and similar ferrous metal surfaces with a coating which will give adequate protection against weather conditions and prevent rusting, but which can be readily and quickly removed. For example agricultural equipment experiences seasonal periods of disuse during which time it is often permitted to remain in the field exposed to the weather. It is undesirable to give a hard permanent coating to the surfaces of plows, mowers, and machinery with external moving parts. On the other hand, a coating of oil or grease is not sufficiently adherent, is readily rubbed off, and does not give protection against rusting. As another example, it is sometimes desired to deliver machinery to a customer who will later apply distinctive paints and coatings. The surface of the machinery must however be adequately protected during delivery. The coating composition used for such protection must be a liquid capable of being applied to the surface by brushing, spraying or dipping at ambient temperatures as low as 0° F. (for winter use) and should quickly dry to a non-tacky finish especially in the case where it is desired to supplement this protection with cloth or paper coverings. The coating surface must also be resistant to light abrasion, rubbing, cracking, checking, chipping, chalking, etc., in order to adequately protect the metal. In any event, and particularly in the case of agricultural equipment, it is essential that the temporary protective coating be readily removed by washing with an available solvent; such an available solvent is kerosene or related hydrocarbon fractions. One cannot depend upon solvents which must be specially procured for the purpose.

To sum up, a temporary protective coating should fulfill the following requirements:

(1) Solution with a pour-point of 0° F. or lower.
(2) Be suitable for application by brushing, spraying or dipping.
(3) Be quick drying.
(4) Produce a non-tacky film.
(5) Be not easily rubbed off at temperatures up to 150° F.
(6) Must not crack, check or peel.
(7) Must be readily removed by kerosene.
(8) Be composed of low-cost ingredients.

There have been no low-cost coating compositions available to agriculturists in quantity, and, as a result, a tremendous depreciation of farm equipment is experienced annually.

The principal object of the present invention is to provide a composition and a method for the protection of ferrous metallic surfaces from rusting. Another object is to provide rust prevention for such surfaces at a low cost and in a simple and economical manner. Another object is to provide a rust preventive coating composition which can be readily and quickly applied to the metallic surfaces to be protected in simple and economical manner for example by brushing, spraying or dipping. Another object is to provide a coating composition which will prevent rusting and which after application will quickly dry or solidify to a tack-free surface. Another object is to provide a firmly adherent, non-brittle, non-chipping and non-chalking rust preventive coating. Another object is to provide a rust preventive coating of the foregoing type which may be readily and quickly removed from metallic surfaces by the use of petroleum solvents such as kerosene, gasoline or the like. Another object is to provide a coating composition and a method for the temporary protection of ferrous metallic surfaces against rust which eliminates the use of a solvent from the formulation. Many other objects of the present invention will appear to those skilled in the art.

We have now discovered a composition which comprises abundantly available, low cost ingredients, which uniquely fulfills the above mentioned requirements and which provides substantially complete protection against rusting for ferrous surfaces normally subject to rusting.

The composition of our invention comprises three principal ingredients as follows:

(1) A petroleum asphalt having a penetration of from 5 to 75 (as measured by the standard A. S. T. M. method D5-25) at 77° F.,
(2) An asphaltite such as gilsonite, and
(3) Petrolatum.

The petroleum asphalt is tacky and provides good adhesion for the surface coating. If however such an asphalt is used alone as the coating, the surface is inconveniently tacky and the coating tends to run off at higher temperatures. The asphaltite is hard and brittle and overcomes the tackiness of the asphalt in the dried film. A film composed entirely of the asphaltite will chip and flake off and furthermore will not be readily removed with hydrocarbon solvents such as kerosene, gasoline or the like. The petrolatum not only gives the desired degree of plasticization but also contributes water resistance to the coating. A coating of petrolatum alone will not give adequate rust prevention.

We have found that blending of the three components just named into a homogeneous mixture and application of this mixture to the ferrous metal surfaces to be protected gives very good protection against rusting. Each of the three components of our composition cooperates with the other components in a new and unusual way to give a composition which meets the requirements enumerated above in an especially outstanding manner.

Usually we combine the three components enumerated above with a suitable volatile solvent to form a coating composition of the desired viscosity for application by ordinary means such as brushing or spraying or the like. We prefer to incorporate an amount of solvent such that the resulting coating composition has a viscosity of from C to D on the Gardner-Holdt scale described on pages 495–500 in "Physical and Chemical Examination of Paints, Varnishes, Lacquers and Colors," by Henry A. Gardner, sixth edition, 1933, Institute of Paint and Varnish Research, Washington, D. C. For this purpose we prefer to use a volatile aliphatic essentially paraffinic hydrocarbon liquid, such as Stoddard solvent. Instead of Stoddard solvent any other equivalent quick-drying solvent may be employed. Usually a volatile petroleum hydrocarbon solvent which is essentially paraffinic is used, examples being petroleum naphtha, gasoline and related cuts derived from petroleum or from natural gas.

In some cases it may be desired to omit a solvent from the coating composition and to use a hot melt method of application, such as hot dipping followed by cooling to solidify the film on the surface of the ferrous metal. This method of application may not be suitable for use in the field. Instead it may be desirable to confine this method of application to factories and plants where facilities are available for safely handling the hot molten composition.

The petroleum asphalt used in the composition of the present invention may be either blown petroleum asphalt or residual petroleum asphalt. Blown petroleum asphalt and residual petroleum asphalt are described in detail on pages 477 to 500 of Abraham, "Asphalts and Allied Substances," fifth edition, 1945, published by Van Nostrand Company, New York. The blown petroleum asphalt or residual petroleum asphalt used in accordance with our invention may have a penetration as measured by the standard A. S. T. M. method D5–25 of from 5 to 75 units at 77° F. The standard A. S. T. M. method of determining penetration is given on pages 990 to 993 of Abraham, just cited.

We prefer however to use a petroleum asphalt having a penetration within the range of from 15 to 30 A. S. T. M. at 77° F.

The use of blown petroleum asphalt is preferable to the use of residual petroleum asphalt. Blown petroleum asphalt is softer and contains more "life-giving" constituents, and is more weather resistant than residual petroleum asphalt derived from the same crude petroleum oil, having the same fusing-point and showing the same proportion of volatile matter. We have secured especially good results using an air blown petroleum asphalt available commercially. This asphalt has a penetration in the range of from 15 to 30 A. S. T. M. at 77° F.

As the asphaltite used in our invention, we prefer gilsonite. Abraham above cited defines "asphaltite" on pages 61 and 62 and in Chapter X as including gilsonite, glance pitch and grahamite. While glance pitch and grahamite may be used in the practice of our invention in place of gilsonite, gilsonite is preferable because of its low cost and availability. Gilsonite contributes the valuable properties of reducing the drying time and eliminating the tack encountered with petroleum asphalt films.

Any commercially available petrolatum may be used in the composition of our invention. As is stated on page 468 of Abraham above cited, petrolatum is the material obtained by diluting crude paraffinaceous petroleum or the residue thereof known as cylinder stock with naphtha followed by chilling and separation of the amorphous residue.

The proportion of petrolatum employed in the composition of the present invention should not exceed 25 per cent by weight of the solids content of the formulation.

If desired, there may be incorporated in the composition of the present invention a minor proportion of a substance known to reduce the rusting of iron. Lead salts are particularly valuable for this purpose. Lead mercaptides and lead salts of high molecular weight fatty acids may be used. Generally speaking however the rust-inhibiting action of the composition of the present invention is so great that the use of such rust inhibitors is totally unnecessary.

The composition of the present invention is capable of affording rust protection for many months and even for a matter of years if such prolonged protection is deemed necessary.

When it is desired to remove the protective film of the present invention, this may be accomplished by simply dissolving the film in a hydrocarbon solvent, for example by rubbing the surface with a cloth soaked in kerosene, gasoline or other readily available petroleum hydrocarbon solvent. The solvent used for this purpose should of course be volatile and is preferably an aliphatic essentially paraffinic hydrocarbon. Other paraffin hydrocarbon solvents than those mentioned may be used if they are available but ordinarily kerosene or gasoline will be the only solvents available in the field.

The proportions of the three solid or non-volatile ingredients of our composition may vary over wide limits and still yield a composition having the superior attributes mentioned above. However, extensive investigation has shown that the preferred proportions are as follows: based upon 100 parts of asphaltite, the composition preferably contains between 50 and 150 parts of the blown or residual petroleum asphalt and between 20 and 100 parts of petrolatum.

If the asphalt employed in the formulation has a penetration in the upper portion of the range of 5 to 75 given above, as for example if it has a penetration greater than 30 but not over 75 at 77° F., it may be necessary to use a greater proportion of gilsonite in the formulation in order to overcome the greater softness and tendency to tackiness of the resulting film which would otherwise obtain.

*Example 1*

The following formulation was prepared:

(1) 100 parts of an air-blown petroleum asphalt with a penetration value in the range 15–30 A. S. T. M. at 77° F.,
(2) 100 parts of gilsonite,
(3) 50 parts of petrolatum, "amber", melting point 137.5° F.,
(4) 300 parts of Stoddard solvent.

Ingredients (1), (2), and (3) were melted and the solvent blended with the melt. The blend was then cooled to room temperature and filtered through 100 mesh screen to remove solid impurities. The viscosity had a value of D on the Gardner-Holdt scale.

A number of rectangular test plates measuring 3 inches by 4 inches were prepared from 20 gauge mild steel by pickling in HCl, and washing with sodium carbonate solution and water, dried with acetone and buffed bright with a steel brush. A single coating of the composition was then applied with a brush.

Some of these plates were supported in a vertical position and exposed to the weather. The film was intact and no rusting was evident after an exposure of six months. A similar steel plate bare of any coating showed signs of rusting in one or two days of weather exposure and was heavily coated with rust in one week. Another steel plate coated with crank case oil, a commonly available material, evidenced rusting after one week of exposure, and was heavily coated with rust after four weeks.

Other plates were similarly supported and exposed. These, however, were sprayed twice weekly with a 20 per cent solution of sodium chloride. The coating did not crack or peel and was protected from rusting for a period of 21 days. Even after rusting commenced, its spread was slow and at the end of six weeks covered only about one-third of the surface. In contrast, uncoated plates or plates covered with used crank case oil and subjected to identical exposure were rusting vigorously after the first day and were completely covered with rust after one week.

After drying, some plates were hung in an air bath thermostated at 150° F. The coating, under these conditions, was firmly adherent.

A number of plates, after weather exposures of one to five months, were dipped in kerosene and then rubbed lightly for 30 seconds or less with a cloth dipped in kerosene. In all cases, the coating was readily removed.

*Example 2*

A formulation exactly as in Example 1, except that the Stoddard solvent was omitted, was prepared and was applied in hot molten form to steel test plates, as by dipping the plates in the molten composition, removing and allowing the plates and adhering film to cool. Protection equal to that described in Example 1 was obtained.

Generally the solids (i. e. the nonvolatile components) content of our composition will consist of the petroleum asphalt, the asphaltite and the petrolatum; as indicated above a rust-inhibitor compound may be added to the composition although the rust-preventing properties of our composition are so great that addition of such a compound is seldom necessary or desirable.

Many advantages of the present invention will be apparent to those skilled in the art. The rust protection is excellent and is not expensive since the composition is composed of cheap and readily available ingredients. The protective film is easily applied and is easily removed by methods available to the agriculturist or other individual using the equipment. The film is long-lasting and does not rub, chalk, chip or flake. The film is sufficiently flexible that moderate flexing or bending of the metallic object does not cause it to be broken or destroyed.

The term "Stoddard solvent" is used in this specification and claims to mean an essentially paraffinic petroleum distillate boiling in the range from 300° F. to 410° F. and having a flash point of not less than 100° F.

We claim:

1. A composition of matter adapted to provide a temporary coating for the prevention of rusting of ferrous metallic surfaces normally subject to rusting, said coating being readily and quickly removable from said surfaces by means of a petroleum hydrocarbon solvent, said composition consisting of 100 parts by weight of air-blown petroleum asphalt having a penetration value within the range of 15 to 30 A. S. T. M. at 77° F., 100 parts by weight of gilsonite, and 50 parts by weight of petrolatum.

2. A composition of matter adapted to provide a temporary coating for the prevention of rusting of ferrous metallic surfaces normally subject to rusting, said coating being readily and quickly removable from said surfaces by means of a petroleum hydrocarbon solvent, said composition consisting of 100 parts by weight of air-blown petroleum asphalt having a penetration value within the range of 15 to 30 A. S. T. M. at 77° F., 100 parts by weight of gilsonite, 50 parts by weight of petrolatum, and 300 parts by weight of Stoddard solvent.

3. The method of temporarily protecting ferrous metallic surfaces from rusting which comprises applying thereto a film of a composition consisting of the following ingredients in the indicated proportions by weight:

| | |
|---|---|
| Air-blown petroleum asphalt, penetration 15–30 A. S. T. M. @ 77° F. | 100 |
| Gilsonite | 100 |
| Petrolatum, melting point 137.5° F. | 50 |
| Stoddard solvent | 300 | allowing said composition to evaporate leaving a residual rust-preventing film which is non-tacky, which is resistant to rubbing off at temperatures up to 150° F., which is firmly adherent, non-brittle, non-chipping and non-chalking, and which does not crack, check or peel, allowing said residual film to remain in place during the period while protection against rusting is desired, and at the end of said period removing said film by dissolution in a volatile aliphatic essentially paraffinic liquid hydrocarbon solvent.

4. A composition of matter adapted to provide a temporary coating for the prevention of rusting of ferrous metallic surfaces normally subject to rusting, said coating being readily and quickly removable from said surface by means of a petroleum hydrocarbon solvent, said composition comprising a petroleum asphalt having a penetration of from 15 to 30 A. S. T. M. at 77° F., an asphaltite, and petrolatum, in proportions such that for each 100 parts by weight of said asphaltite there is present 100 parts by weight of said petroleum asphalt and 50 parts by weight of said petrolatum.

5. The method of temporarily protecting ferrous metallic surfaces from rusting which comprises applying thereto a film of a composition comprising a petroleum asphalt having a penetration of from 15 to 30 A. S. T. M. at 77° F., an asphaltite, and petrolatum, the proportions being such that for every 100 parts by weight of said asphaltite there is present 100 parts by weight of said petroleum asphalt and 50 parts by weight of said petrolatum, allowing said film to remain thereon during the period of time while protection is desired, and at the end of said period of time removing said film by dissolution in a volatile liquid aliphatic hydrocarbon solvent.

WILLIE W. CROUCH.
JOSEPH A. DELAP.

(References on following page)

REFERENCES CITED

The following references are of record in the file of this patent:

UNITED STATES PATENTS

| Number | Name | Date |
|---|---|---|
| 1,404,511 | Bullock | Jan. 24, 1922 |
| 2,069,314 | Hunt et al. | Feb. 2, 1937 |
| 2,162,618 | Izard | June 13, 1939 |
| 2,250,185 | Mohler | July 22, 1941 |
| 2,299,144 | Heritage et al. | Oct. 20, 1942 |
| 2,394,101 | Phillips | Feb. 5, 1946 |
| 2,396,910 | Zaisser | Mar. 19, 1946 |

FOREIGN PATENTS

| Number | Country | Date |
|---|---|---|
| 25,081 of 1903 | Great Britain | Oct. 13, 1904 |